Feb. 3, 1970 P. E. SHAFER 3,493,946

TRAVELING DOMAIN WALL MEMORY SYSTEM APPARATUS

Filed Feb. 1, 1968 8 Sheets-Sheet 1

INVENTOR.
PHILIP E. SHAFER

BY Edward J. Feeney Jr.

ATTORNEY

INVENTOR.
PHILIP E. SHAFER
BY Edward J. Feeney Jr.
ATTORNEY

TRAVELING DOMAIN WALL MEMORY SYSTEM APPARATUS

Filed Feb. 1, 1968 8 Sheets-Sheet 3

INVENTOR.
PHILIP E. SHAFER

BY Edward J. Feeney Jr.

ATTORNEY

TRAVELING DOMAIN WALL MEMORY SYSTEM APPARATUS

Filed Feb. 1, 1968

INVENTOR.
PHILIP E. SHAFER
BY Edward J. Feeney Jr.
ATTORNEY

TRAVELING DOMAIN WALL MEMORY SYSTEM APPARATUS

Filed Feb. 1, 1968 8 Sheets-Sheet 5

INVENTOR.
PHILIP E. SHAFER
BY Edward J. Feeney Jr.
ATTORNEY

Feb. 3, 1970 P. E. SHAFER 3,493,946
TRAVELING DOMAIN WALL MEMORY SYSTEM APPARATUS
Filed Feb. 1, 1968 8 Sheets-Sheet 6

INVENTOR.
PHILIP E. SHAFER
BY Edward J. Feeney Jr.
ATTORNEY

INVENTOR.
PHILIP E. SHAFER
BY Edward J. Feeney Jr.
ATTORNEY

TRAVELING DOMAIN WALL MEMORY SYSTEM APPARATUS

Filed Feb. 1, 1968 8 Sheets-Sheet 8

INVENTOR.
PHILIP E. SHAFER
BY Edward J. Feeney Jr.
ATTORNEY

United States Patent Office 3,493,946

Patented Feb. 3, 1970

3,493,946

TRAVELING DOMAIN WALL MEMORY SYSTEM APPARATUS

Philip E. Shafer, Holmes, Pa., assignor to Burroughs Corporation, Detroit, Mich., a corporation of Michigan Filed Feb. 1, 1968, Ser. No. 702,254
Int. Cl. G11b *5/00*
U.S. Cl. 340—174 9 Claims

ABSTRACT OF THE DISCLOSURE

The present application discloses a memory system apparatus such as might be utilized to store binary digital information in a digital processing system. The apparatus includes means for utilizing the travel of a magnetic domain wall through a magnetic medium to thereby provide a memory replacement for revolving magnetic medium drums and disks as well as for rotating magnetic tapes. The present apparatus provides the basic capability of these earlier devices while eliminating all mechanical movement. Further, it accomplishes this feat with a memory system apparatus which has removable magnetic media.

CROSS REFERENCE TO RELATED APPLICATIONS

A number of related applications assigned to the present assignee have been filed upon similar subject matter. They include: "A Serial Entry Serial Access Memory Device" by William D. Murray and Robert A. Tracy, Ser. No. 596,707 and "A Block Oriented Random Access Memory" by the same inventors, Ser. No. 596,706, both were filed Nov. 23, 1966. Still another related application, also presently pending, is entitled "A Serial Access Memory Using Traveling Domain Walls" by Philip E. Shafer who is also the present inventor. This latter application was also filed on Nov. 23, 1966 and has Ser. No. 596,601. The contents of these related applications are hereby incorporated into this application, especially with regard to their descriptive and background material. This related information is considered useful for a more complete understanding of the present invention.

BACKGROUND OF THE INVENTION

Field of the invention

The phenomena of traveling domain walls passing through a magnetic material is fairly well known. In this phenomenon a transverse wall between oppositely magnetized regions of a thin ferromagnetic film is caused to travel at high velocity through the film (5000 feet per second). This traveling wall sets up a moving magnetic field which may be used to disturb the magnetically stored contents of another ferromagnetic film.

Description of the prior art

Magnetic devices utilizing this domain wall concept are known in the art. In many of these earlier devices the traveling domain wall field was stepped sequentially down a magnetic strip by the successive application of an external magnetic field to the strip. This sequential stepping along the magnetic strip immediately suggested the use of the device known as a magnetic shift register and quite a few variations of such devices are familiar to those skilled in this art.

Other applications using the traveling domain wall concept include logical gating circuits and coincident-current memories. In the present device, this sequential passage of the domain wall along a magnetic strip is used as a scanning means in a block oriented random access memory to both write into and read out of the memory.

BRIEF SUMMARY OF THE INVENTION

The present invention relates to a magnetic-storage technique which is designed to fulfill bulk storage requirements of large digital systems. The specific intent is to replace discs, drums and tapes, particularly in severe military environments, with an all-solid state device having no moving parts and, in commercial environments to supply, at a much reduced cost, the buffer memory capacity required between main memory and discs, drums or tapes.

This storage system operates asynchronously, and has a very small random access time when compared with devices it would replace. Access is made in one to five microseconds to blocks of data with multi-track, serial-parallel transfer within the block. Transfer rates of five to ten million bits per second per track may be expected, with a capacity of 2000 to 3000 bits of data per track, so that less than a millisecond is required to read or write each individual block. Reading is non-destructive, and data transfer is accomplished by complete blocks. A minimum economical memory module capacity is approximately 5–15 million bits.

The present system includes a storage medium which is removable into sealed cassettes. These are operationally equivalent to the removable tape reels in a magnetic tape storage system. Simplification and possibly improved performance would accrue if the memory medium were stationary. In this latter case the system would then be comparable to a disc memory.

As mentioned previously, the physical basis for the development of the present invention is the traveling magnetic domain wall. As noted, such a wall sets up a moving magnetic disturbance which is used to scan information stored in an adjacent magnetic film. It can also be used to control the location of writing into the adjacent film The information being written is determined by the polarity of current in a combination sense/information line which links the storage film. The position of the scanning element (the domain wall) determines the point at which writing occurs. The domain wall thus corresponds more or less to the deflection system of a television set, which is decoupled from the information in the picture, while the information current corresponds to beam modulation. In contrast, for a moving head associated with more conventional magnetic storage schemes, information input is by modulation of the field of the moving head.

BRIEF DESCRIPTION OF THE DRAWINGS

Numerous other embodiments will suggest themselves to those skilled in the art and other objects and features of the present invention will become apparent when this specification is studied in conjunction with the accompanying drawings in which.

DETAILED DESCRIPTION

Figure 1:
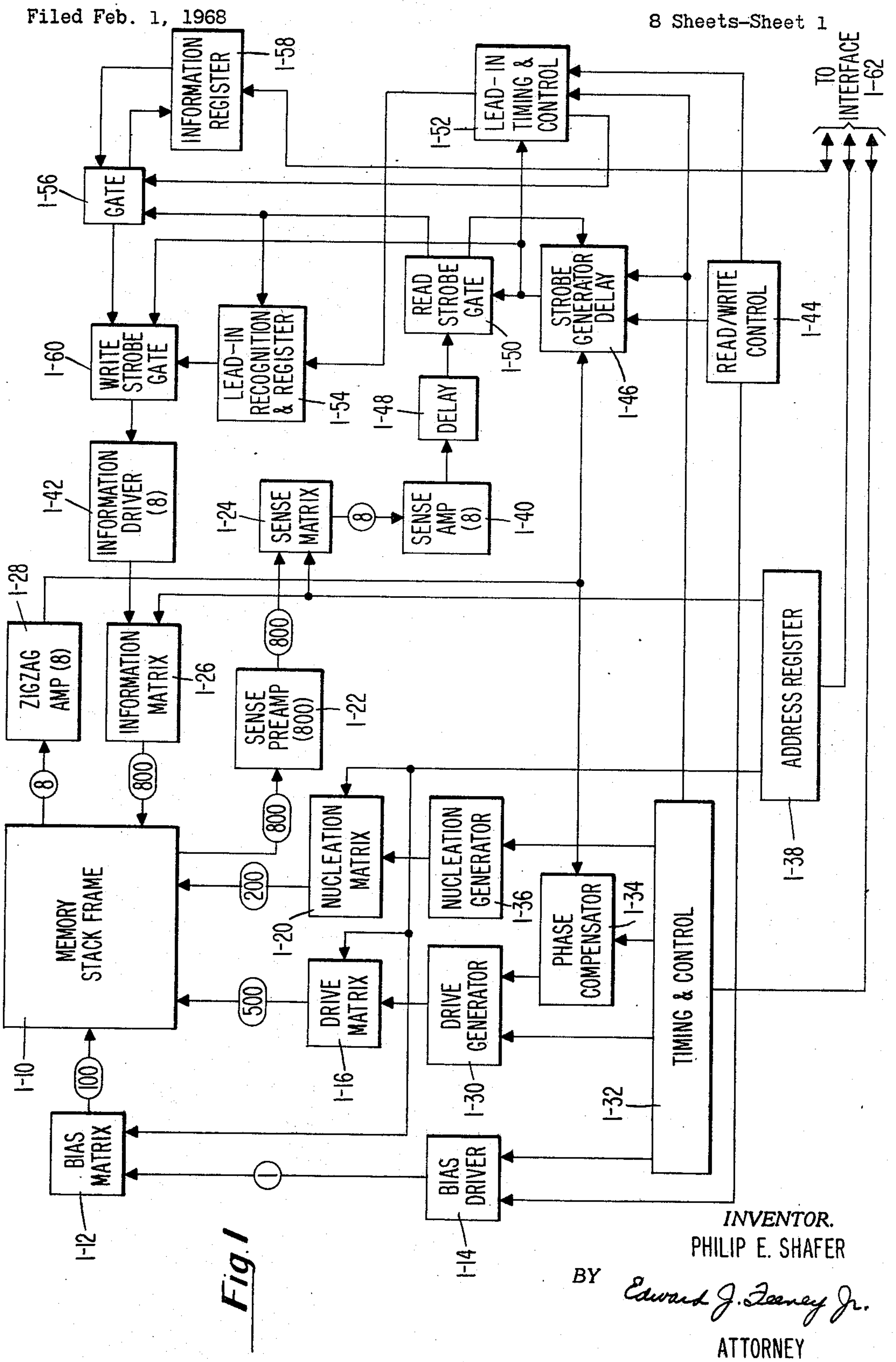
FIGURE 1 is a block diagram of the block-oriented random access memory.

Referring, in particular, to FIG. 1 there is shown a block diagram of the proposed memory system. A memory stack 1–10 is activated by a plurality of matrices. Thus a bias matrix 1–12 provides the signals to program the bias windings of the selected frame of the stack. A drive matrix 1–16 which resembles the bias matrix selects the proper drive solenoid in the memory stack 1–10. The nucleation matrix 1–20 is also quite similar to the bias matrix 1–12, in that it steers the outputs from the nucleation generator 1–36 into the appropriate nucleation windings of the stack. The control information for this nucleation matrix 1–20 is received from the address register 1–38. Similarly, this control information is supplied by the address register 1–38 to the drive matrix 1–16 and also the bias matrix 1–12. The nucleation generator 1–36 is a current driver circuit. It includes a feedback control circuit which controls the rise time and the pulse shaping of the pulse applied via the nucleation matrix 1–20 to the selected nucleation winding of the stack.

The information drivers 1–42 are bipolar current sources which provide the write current information. There are eight of these drivers in the present system. Each of these drivers is activated by the application of a strobe signal at the appropriate time as determined by the write strobe gate 1–60 in response to a timing signal from the lead-in timing and control circuit 1–52.

The output signals from the information drivers 1–42 are applied to selected lines of the memory stack 1–10 via the information matrix 1–26.

The particular location selected, of course, is determined by the contents of the address register 1–38. However, the information which is to be written into the selected location is determined by the contents of the information register 1–58.

In the case of a read operation, the sense preamplifiers 1–22 receive signals as the result of the traveling domain wall selected and activated by the nucleation matrix 1–20.

These sensed signals are coupled to the sense matrix 1–24. The sense preamplifier 1–22 not only receives these inputs from the stack sense lines, but it adequately amplifies these small signals to enable them to resist degradation by losses and noise in the sense matrix 1–24. This preamplifier circuit itself has a very low noise figure to minimize degradation of the signal to noise (S/N) ratio.

The switched locations of the sense matrix 1–24 provide output signals which are coupled to the sense amplifiers 1–40. These amplified signals are delayed by the delay circuit 1–48 prior to being coupled to the read strobe gate 1–50.

The zigzag amplifier is so named because of its association with the zigzag lines of the memory stack. It does note denote any special amplifier configuration. Actually the zigzag amplifiers 1–28 are for all practical purposes, identical to the sense amplifiers 1–40.

It should also be noted that the sense matrix 1–24 actually is an integral part of the sense preamplifiers 1–22. In the present configuration, turning off positive (plus) polarity power to a particular sense amplifier essentially presents an open circuit to the other circuits connected to the sense bus.

The output of the zigzag amplifiers 1–28 is concurrently coupled to the phase compensator 1–34 and the strobe generator delay circuit 1–46. The phase compensator 1–34, or phase comparator as it is also known, is basically a time difference (or phase difference) to voltage converter. Thus the phase difference denoted between the signal from the timing and control means 1–32 and the signal from the zigzag amplifier 1–28 is considered to be an "error" signal. This "error" signal is proportional to the difference between the signal relating to the TDW velocity (the zigzag signal) and the external clock Timing and Control (T&C) signal. The signal so generated is used to correct the drive current to the drive solenoid which, in turn, corrects the velocity.

Figure 2:
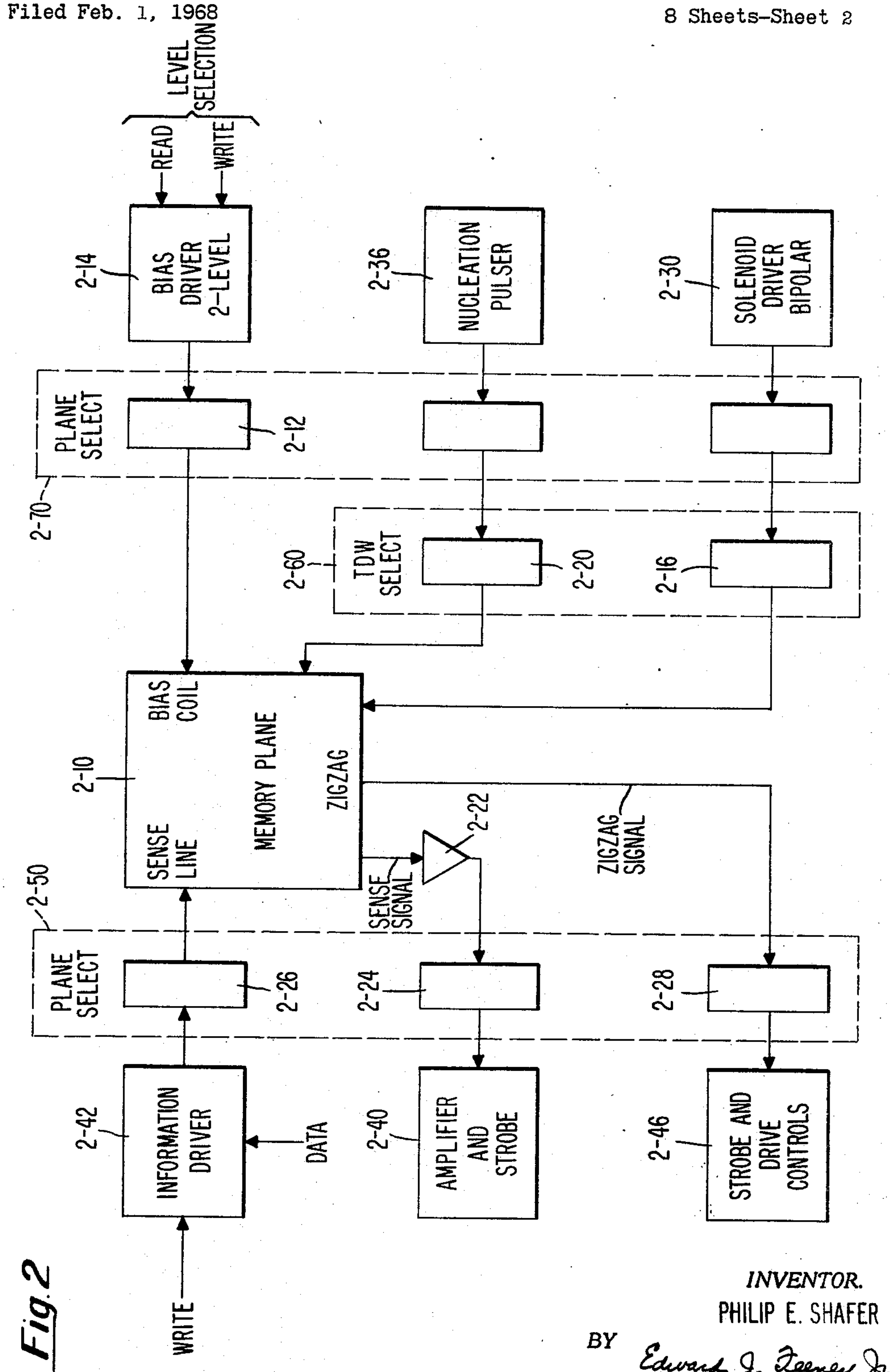
FIGURE 2 is a block diagram of the selection system of the memory of FIGURE 1.
Figure 3:
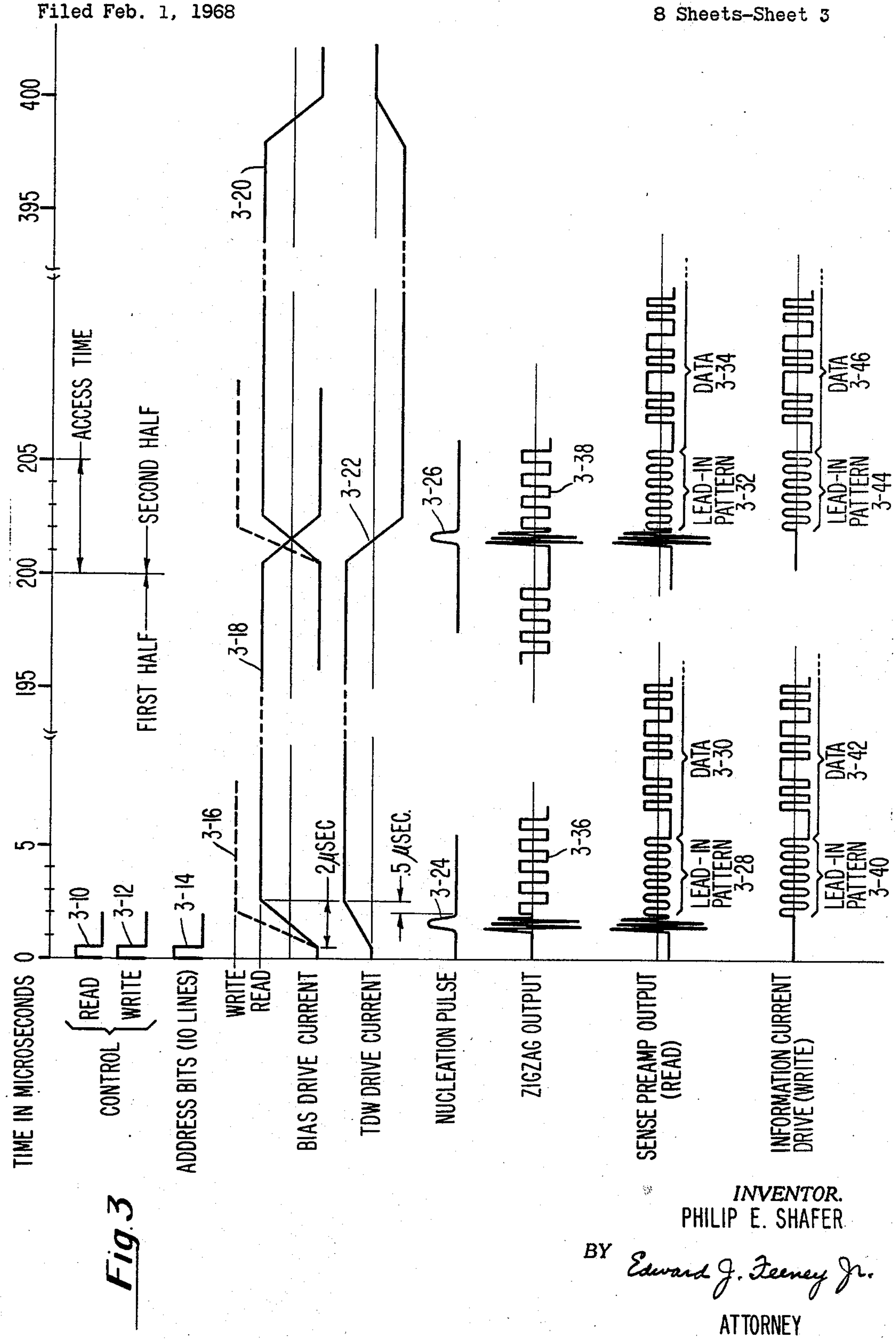
FIGURE 3 is a timing chart illustrating the timing relationship of the signals applied to the memory stack.

The block functions of the selection circuits are shown in FIGURE 2 and the timing of these circuits is shown in FIGURE 3. The reference characters used in conjunction with both of these figures will be used in the following discussion, however, it will be noted that those relating to FIGURE 2 will have a preceding numeral of 2 whereas those relating to FIGURE 3 will have a corresponding numeral 3 in its connotation.

A control pulse on either the read or the write control line to the bias level driver 2–14 will denote whether the operation to be performed is a read or a write operation.

This pulse signal initiates the operation. In the case of read, the block address is decoded in the various selection matrices to:

(1) Connect the bias driver 2–14 to the selected plane bias winding (1 of 100) of the plane selection means 2–12.

(2) Connect the TDW driver 2–30 to the selected TDW assembly pair (1 of 500) in the memory stack 2–10 via the drive matrix 2–16.

(3) Connect the nucleation pulser 2–36 to the desired half frame (1 of 100) via the nucleation matrix 2–20.

(4) Connect the desired group of eight sense preamplifiers 2–22, 2–24 to the eight sense amplifiers 2–40 (three independent matrices each selecting 1 of 100).

(5) Connect the first group of eight zigzag amplifiers 2–28.

The read control pulse also turns on the bias driver 2–14 to the read amplitude level, turns on the TDW driver 2–30 and triggers the nucleation pulser 2–36 after the proper delay. After the first half of the block is read, internal controls continue with the second half by causing the following operational connections:

(1) Connect the bias driver 2–14 to the second plane of the same frame 2–10 and provide the read current signal 3–20.

(2) Reverse the polarity of TDW drive current 3–22 to provide the negative going signal.

(3) Trigger the nucleation pulse driver 2–36 again, after the proper time delay, to provide the nucleation pulse 3–26.

(4) Connect the eight sense preamplifier outputs of the second pulse.

(5) Connect the second group of eight zigzag amplifiers.

The write operation is the same as read, except for operational steps (1) and (4) listed above. In step (1) the bias driver is turned on with the larger (write) amplitude signal 3–16 and in step (4) the eight information drivers are connected to the selected group (1 of 100) of sense lines, instead of the outputs of the preamplifier group being connected to sense amplifiers.

Figure 4:
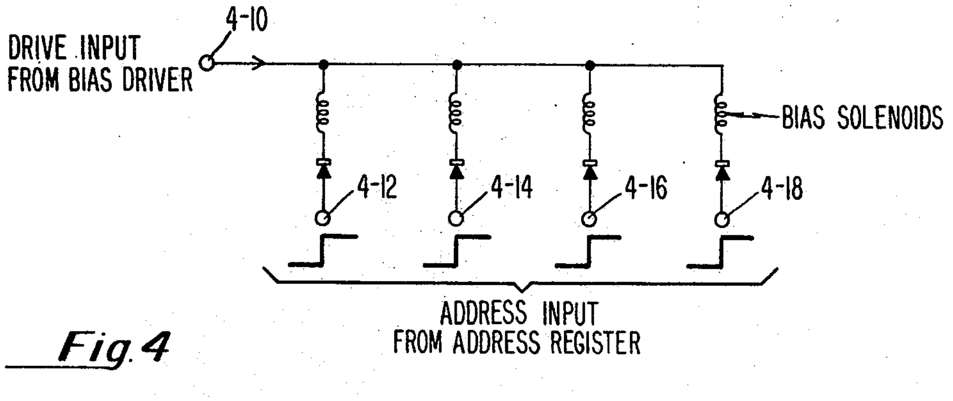
FIGURE 4 is a schematic diagram of the bias matrix.

Referring next to FIGURE 4, there is shown the bias matrix schematic. This circuit is used to apply the appropriate bias signals to the bias windings of the selected frame. Signal 4–10 from the bias driver (FIGURE 5) is switched from frame to frame by means of this simple diode matrix. Address information signals applied to terminals 4–12, 4–14, 4–16 and 4–18 from the address register 1–38 of FIGURE 1 will select the appropriate frame by enabling a particular diode gate within the matrix.

Figure 5:
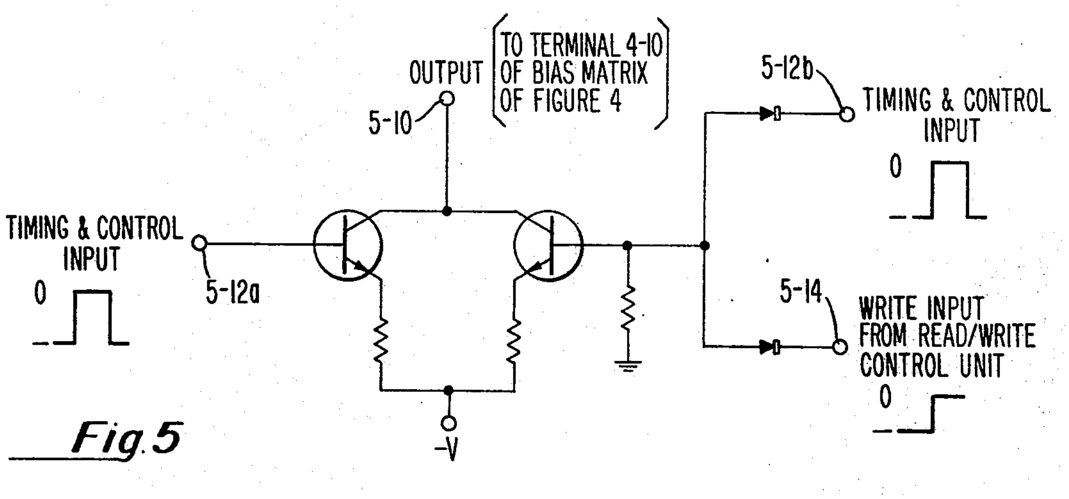
FIGURE 5 is a schematic diagram of the bias driver.

The bias driver circuit is shown in FIGURE 5. It receives timing information from the timing and control unit at terminals 5–12*a*, 5–12*b* and also from the read-write control unit at terminal 5–14. Read-write control is necessary because of the higher bias fields required during the write operation. The output terminal 5–10 is connected to terminal 4–10 of the bias matrix as indicated.

Figure 6:
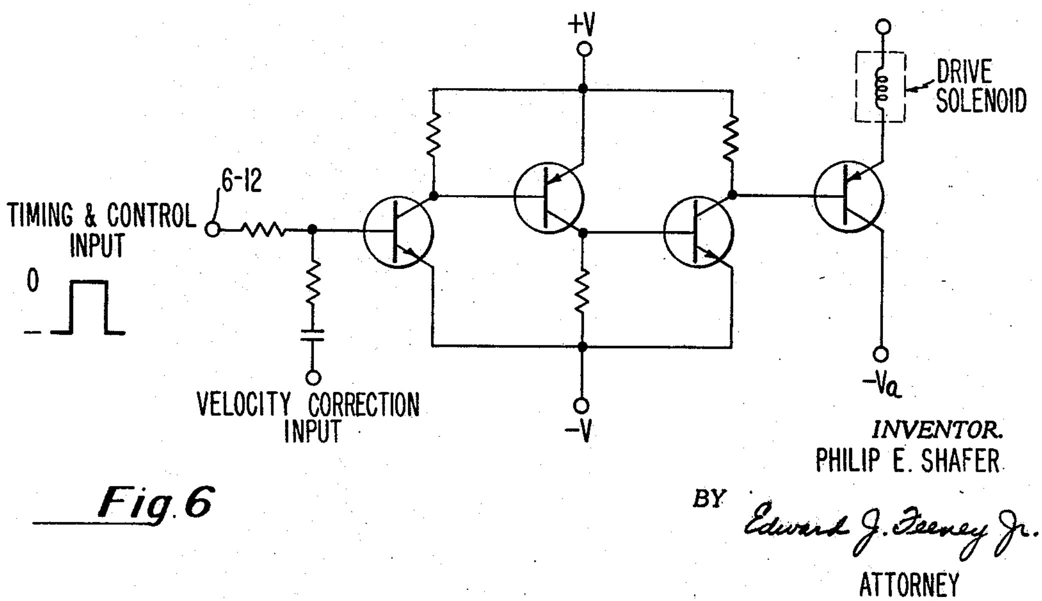
FIGURE 6 is a schematic diagram of the driver circuit used on the velocity detecting and correcting system.

Before consideration of the driver circuit of FIGURE 6, it should be repeated that the driver matrix 1–16 of FIGURE 1 which the diode circuit operates, resembles the bias matrix shown in FIGURE 4. Its function is to select the proper drive solenoid in the memory stack frame 1–10 by means of information in the address register and in response to the driver current signal from the driver. A schematic of the driver circuit is shown in FIGURE 6. It is the brawn for a velocity detecting and correcting system. During the driver's active time, signals from the phase comparator next shown in FIGURE 7, produces an error signal. This error signal is proportional to the phase difference of signals relating to the TDW velocity and an external clock. This signal corrects the velocity of the traveling domain wall.

Figure 7:
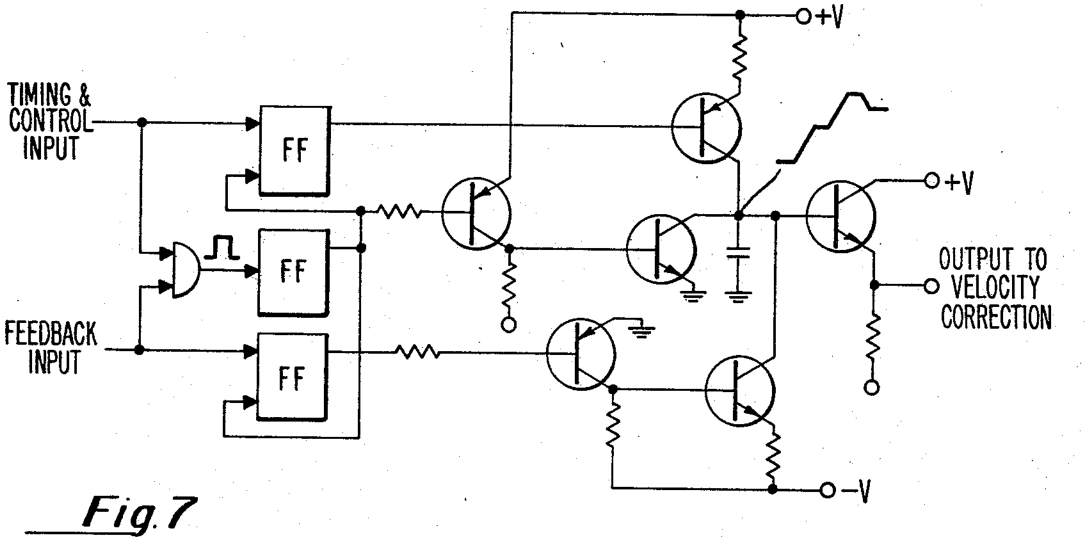
FIGURE 7 is a schematic diagram of the phase comparator used in the memory system.

The phase comparator schematic is shown in FIGURE 7. It is basically a time difference or phase difference to voltage converter. A logic signal from either the zigzag output or from the timing and control means complements a flip-flop that allows a current source to charge a capacitor. The voltage polarity of the capacitor is determined by which pulse comes first. The second pulse resets the system. The output from the comparator is thereafter fed to the velocity correction input terminal shown in FIGURE 6.

Figure 8:
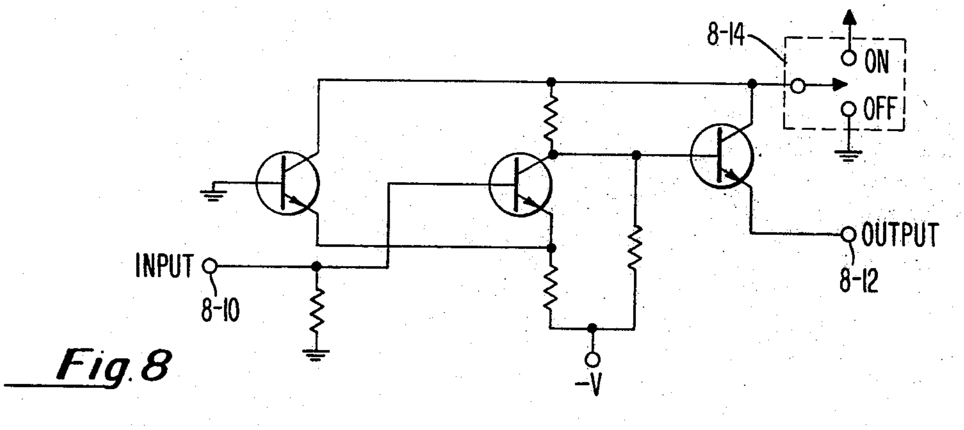
FIGURE 8 is a schematic diagram of the sense matrix. It is an integral part of the sense preamplifier.

The sense matrix of FIGURE 8 is an integral part of the sense preamplifier. In the present system, the switch 8–14 operates to remove positive (plus) power from a particular sense amplifier, which then essentially presents an open circuit to the others connected to the sense bus, The switch 8–14 shown schematically would be an electronic switch controlled by address information.

Figure 9:
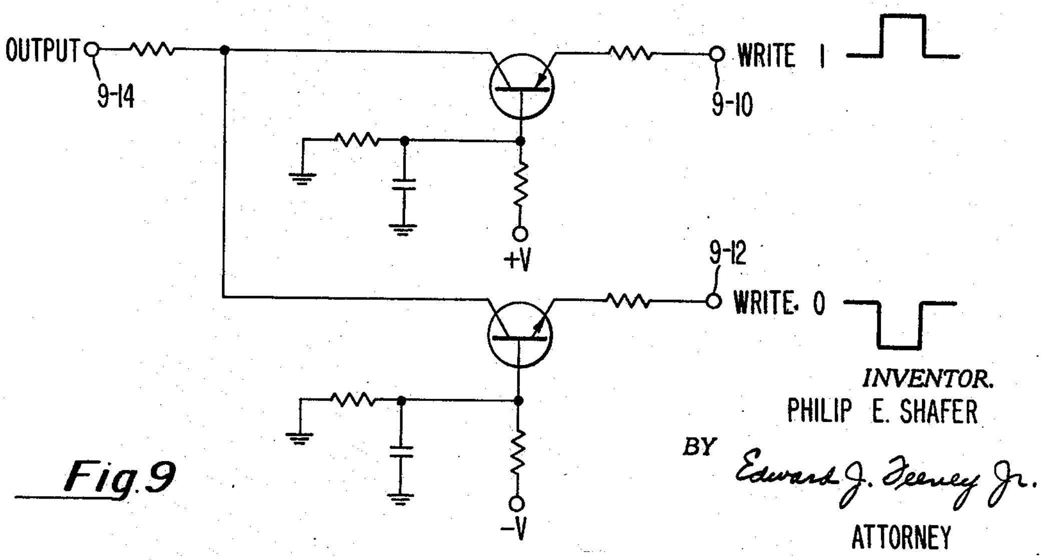
FIGURE 9 is a schematic diagram of the information driver circuit.

The schematic of FIGURE 9 illustrates the information driver circuit. It provides bipolar output current at terminal 9–14 in response to the respective write signals applied to terminals 9–10 and 9–12. In the present instance it provides approximately 200 to 300 milliamperes of current on the information line at write time.

Figure 10:
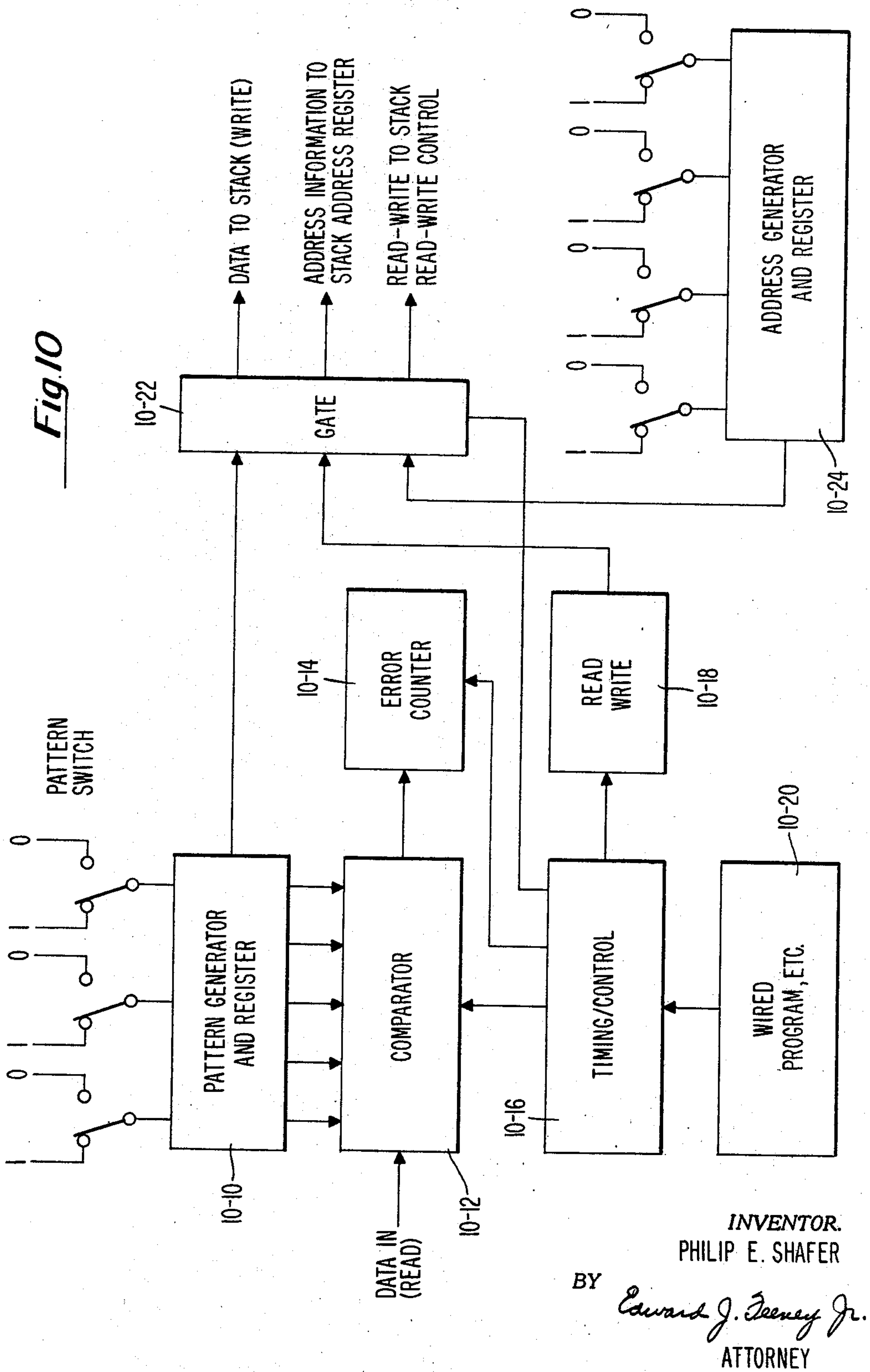
FIGURE 10 is a simplified block diagram of an error rate detector and memory exercise used as test equipment to check the memory system.

The error rate detector and memory exerciser shown in FIGURE 10 is a two-fold piece of test equipment with both automatic and manual modes of operation. However, in the figure, the manual mode is illustrated. In the automatic position, the whole test system might be operated under computer control and would thus be capable of detecting and analyzing complex errors and generating complex random and nonrandom test data.

In the manual mode shown the test system is able to insert by manual control a fixed pattern to the memory stack. It also compares the data read out of the memory stack with the fixed pattern. Errors in both directions are detected and counted.

Figure 11:
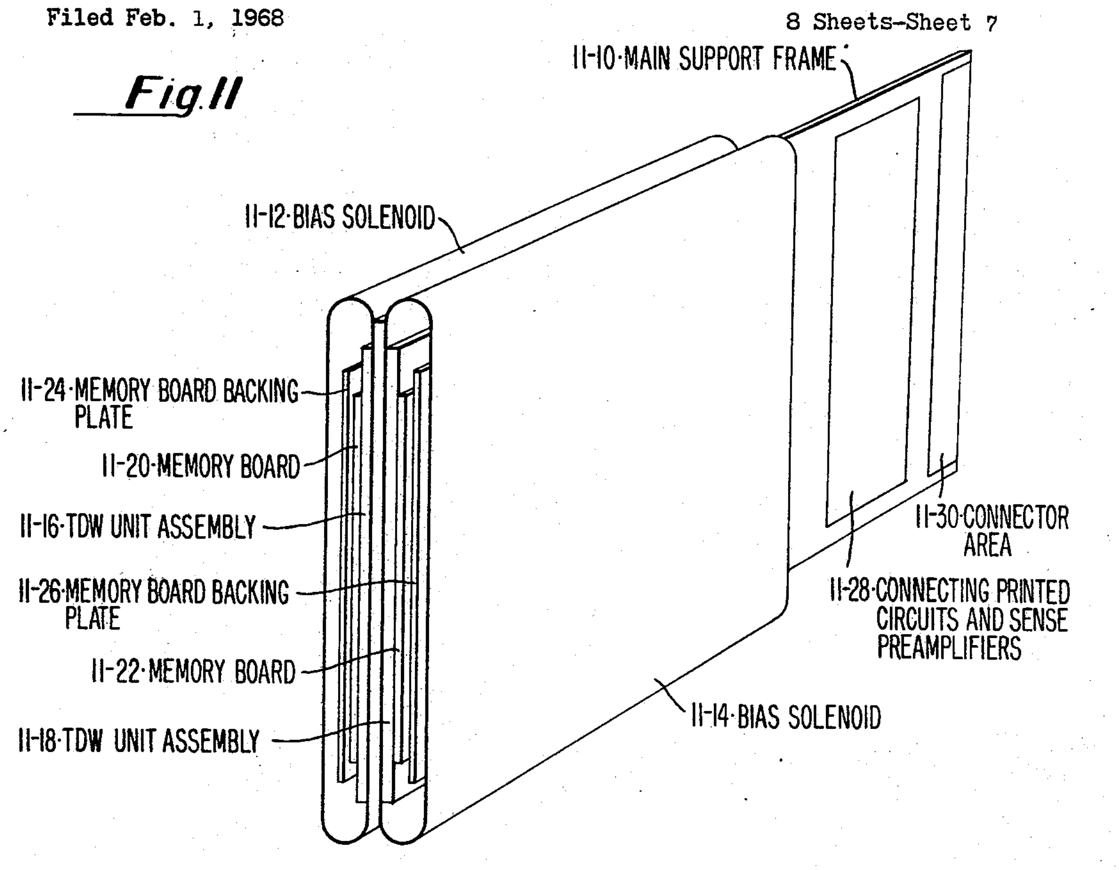
FIGURE 11 is the overall frame layout of the block oriented random access memory stack.

The memory stack for the present inventive system comprises a plurality of vertical frames mounted in an air-cooled enclosure. A supporting structure retractable from the enclosure is provided for mounting the frames. Each frame further comprises a pair of TDW unit assemblies together with their removable memory boards. This is shown in FIGURE 11 which illustrates the configuration of one of the frames of the block oriented random access memory. Central to the structure is the main support frame 11–10. On opposite sides of this support a pair of bias solenoid windings 11–12, 11–14 are connected in a loop-like manner. Within each of these bias loops 11–12, 11–14 there is positioned a traveling domain wall (TDW) unit assembly 11–16, 11–18, a memory board 11–20,

11–22 and a memory board backing plate 11–24, 11–26. The sense preamplifiers and the connecting printed circuits 11–28 are shown positioned toward the rear of the main support frame 11–10 as is the connector area 11–30.

Memory boards will be manually inserted but they require a tool for their removal. A system of suction channels is provided for holding the memory boards against the TDW units. This is more clearly shown in FIGURE 12.

Figure 12:
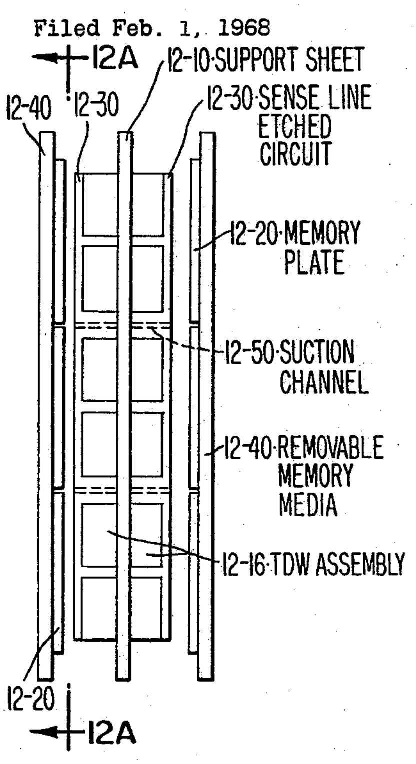
FIGURE 12 is an assembly drawing of the block oriented random access memory frame.
Figure 12A:
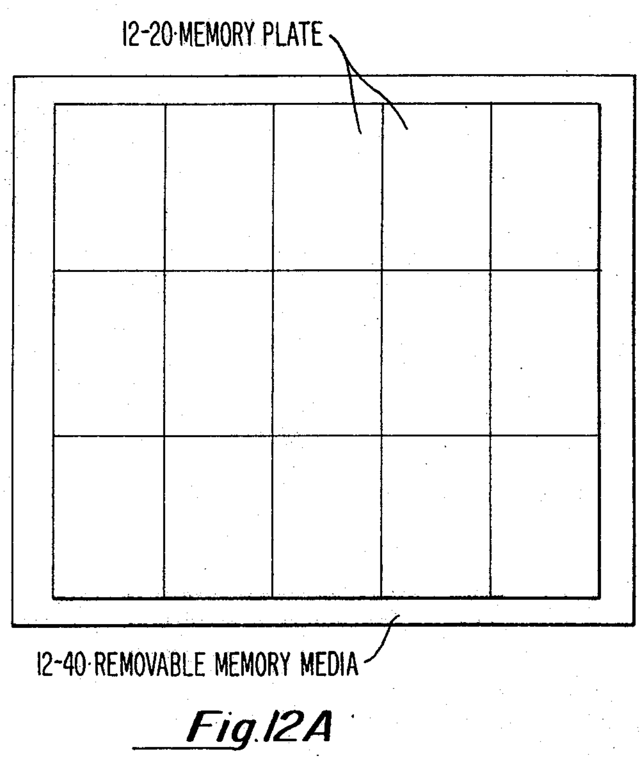
FIGURE 12A is a view looking along line 12A of FIGURE 12.

In FIGURES 12 and 12A, a support sheet 12–10 has a plurality of TDW assemblies 12–16 mounted on its opposite sides. Immediately adjacent these assemblies on both sides is a sense line etched circuit 12–30. A removable memory medium 12–40 is placed adjacent either side of this symmetrical assembly and held against the sense line circuits by the application of a suction force through the suction channels 12–50. On each of these removable memory media 12–40, there is mounted a plurality of memory plates 12–20.

Figure 13A:
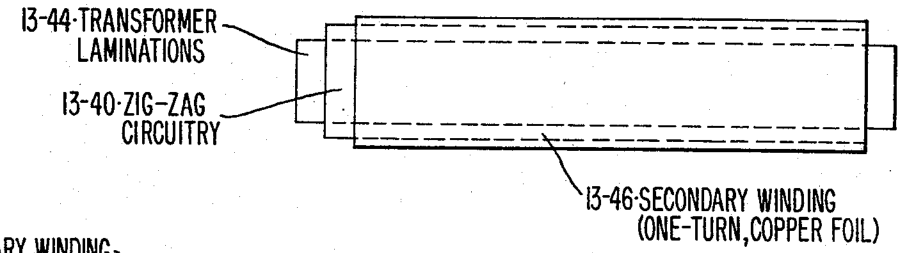
FIGURE 13A is a plan view of the structure shown in FIG. 13.
Figure 13:
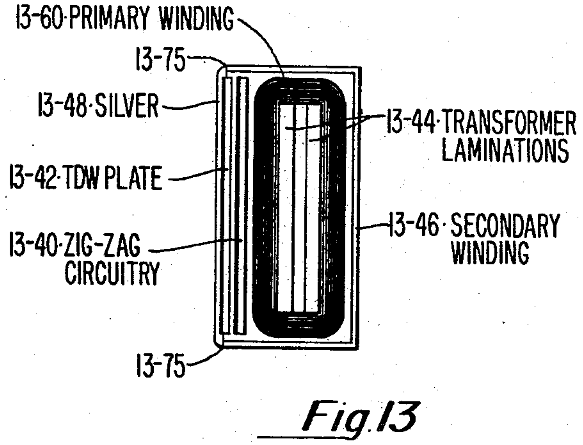
FIGURE 13 is an end view of the traveling domain wall assembly structure.

FIGURES 13 and 13A illustrate, still further, the construction details of a traveling domain wall assembly. In these end and plan views of the assembly (FIGURES 13 and 13A respectively), a pair of transformer laminations 13–44 are shown. About these laminations are wound the primary windings 13–60 of the transformer. This combination of laminated core and primary windings are then covered with silicone rubber to provide a completely encased wound core piece. A zigzag circuit is etched on a thin printed circuit board 13–40 and the board is located next to the wound core piece. Adjacent this board 13–40 is positioned a TDW plate 13–42. This plate is a glass substrate with the traveling domain wall (TDW) film deposited on one of its surfaces. This substrate is then placed next to the zigzag circuit board with the deposited film side away from the circuit board. On top of the TDW film a silver drive line is evaporated until it is approximately .4 mil thick. In some cases it may be necessary to place a thin layer of silicon monoxide between the TDW film and the evaporated silver drive line.

This entire TDW assembly is then encapsulated in a suitable potting material.

A copper secondary winding 13–46 is thereafter electro-deposited on the three side surfaces not covered by the silver drive line. An electrical bond 13–75 is then made where the silver drive line edges meet the electro-deposited copper.

This copper secondary winding 13–46 is particularly vital to the operation of the present invention.

This invention therefore is intended to include the use of a transformer driving means which has its its secondary winding a single conductive sheet interposed between a traveling domain wall film and a magnetic film memory medium or other structure sensitive to a magnetic field. The insertion of this secondary sheet causes the resulting field to favorably distort the flux pattern induced in the memory film by the TDW field.

Thus it has been discovered that this single secondary sheet acts as an eddy-current shield to favorably shape the field from the traveling domain wall film and thereby provide a properly shaped field to drive the magnetic memory film. This shielding effect provided by the secondary sheet is, of course, in addition to its function as a conductor to carry the drive current.

When the use of a transformer was considered to apply the drive current for the TDW film, a single turn secondary sheet was used rather than a high plurality of secondary turns of wire to get the desired Ampere Turns (AT). However, this choice was originally made because of the manufacturing advantages of a single sheet secondary over a multi-turn secondary. It was unexpectedly discovered later, however, that this choice was not only desirable from a manufacturing viewpoint but necessary for improved operational purposes.

In the absence of this secondary conductive sheet 13–46. the TDW field approximates the filed from a moving line of magnetic poles and induces a flux in the memory film which is bipolar, that is, oppositely directed on each side of the traveling domain wall film. Further, this field is symmetrically arranged about it. Since the memory film is sensitive to drive current in either direction, this situation represents a double reading of the stored information. Such a reading sequence naturally results in intolerable confusion.

In order to approximate a unipolar drive, it is necessary to emphasize one peak at the expense of the other. This is accomplished by applying a uniform bias field to the structure. This bias field application causes an increase in one field by adding to it and a decrease in the other field by subtracting from it.

Also with the most sensitive memory film material presently known, the peak driving field needed for reliable writing of information is larger than that which can safely be used for nondestructive reading. This larger peak value must be obtained by increasing the bias field for writing. The entire memory field is therefore subjected to a large steady bias field in the hard direction during writing.

Thus for each bit of information, the entire memory track is driven by a field along its easy axis. The film along its easy axis, of course, may be magnetized in a first (ONE) and a second (ZERO) direction to write either a zero or a one at the existing location of the TDW field.

Therefore, the length of the memory track which has already been scanned by the TDW field (i.e. presently storing recently written information) is subjected to a disturb condition consisting of a steady hard direction field and an alternating easy direction field. This disturb condition is severe because the hard direction bias field is the sum of the excess field required for writing and the initial bias field required to attain unipolar reading.

When a conductive sheet was introduced between the films and a second conductive sheet outside the memory film was removed, writing was immediately successful with large operating margins of drive field, material characteristics and film spacing. A preliminary mathematical analysis led to the suspicion that the eddy-current shielding effects of the conductive sheet between the films was favorable while that of the conductive sheet outside the memory film was unfavorable. This has since been confirmed by a more thorough and complete analysis. This latter analysis predicts that for a selected sheet resistance the effect is to increase the peak flux ahead of the TDW while decreasing the magnitude of the reversed peak behind the TDW. The transition between the peaks is only slightly less sharp than it is without the conductive sheet.

The increase in the magnitude of the leading peak is unexpected since the eddy-current shielding effect reduced the field intensity at the location of the memory film. But it is accounted for by the fact that the distortion caused by the eddy currents consists of a circular field component making the field ahead of the TDW more nearly parallel to the plane of the memory film. Thus the memory film is therefore driven more efficiently.

It is fortunate that it is the leading peak that is increased because writing must take place during the decrease from peak value of the drive field in the memory field, and with the observed distortion, the decrease is sharp, permitting the required high resolution writing. The calculated ratio of the two peak flux amplitudes is large enough (3:1 or more) so that with proper proportioning it is possible to read without the use of a bias field. Further since reduced total bias is required for writing, the disturbance of existing written information becomes negligible.

The experimental and mathematical analyses were undertaken in order to determine the maximum tolerable eddy-current distortion since a conductive sheet of low sheet resistance was desirable to minimize the power required to drive the necessary current. It is important herein that the sheet resistance necessary to produce the desired degree of distortion be sufficiently low so that the same sheet can be used to carry the drive current with reasonable power dissipation.

Low resistivity material such as silver or copper is desirable for the conductive sheet in order to minimize the thickness required, but thicker layers of somewhat higher resistance metals such as gold, chromium, aluminum or titanium are satisfactory if the small increase in spacing between films (caused by the additional thickness) is acceptable.

Figure 14:
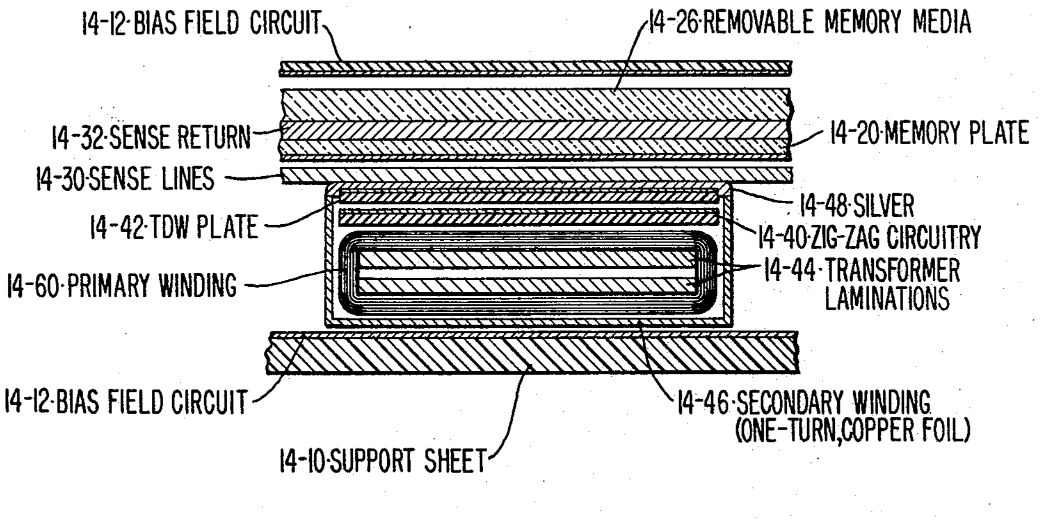
FIGURE 14 illustrates the cross sectional detail of one TDW assembly.

FIGURE 14 illustrates more clearly the combined cross-section of the TDW assembly with the memory medium, the bias field circuit loop and the support sheet. It will be recalled that the assemblies on either side of the support sheet 14–10 are identical consequently only a single side will be described. Starting at the lower portion of FIGURE 14, a bias field circuit 14–12 is deposited upon support sheet 14–10. Immediately adjacent the bias field circuit is positioned one of the TDW assemblies previously described in connection with FIGURE 13. Thus, the copper clad secondary winding 14–46 rests next to bias circuit, while inside this encapsulated segment there is included a pair of transformer laminations 14–44, a primary winding 14–60 encased in a silicone rubber, a zigzag circuit board 14–40, and a TDW plate 14–42 capped by a silver drive winding 14–48. A sense line etched circuit 14–30 is bonded to the surface of this drive winding 14–48. A memory plate 14–20 is the next layer of the assembly. These plates are film deposited glass substrates and they are mounted in the assembly by bonding them to the sense return surface 14–32. This surface 14–32 is a copper ground surface plane covering the memory medium carrier 14–26. This carrier is also called a memory board and is a thin glass epoxy sheet with the copper sense return covering its inside surface. The other side of the bias field circuit loop 14–12 completes the assembly.

By using a particular interconnection scheme it is possible to sequentially write into or read out of a pair of TDW assemblies while keeping the noise level to a minimum. This is accomplished primarily by the fact that driving field for the successive bits along a track is not produced by a sequence of electrical pulses on successive members of an array of drive lines as in a conventional thin film memory, but by the steady motion of the magnetic field radiated by the moving domain wall, which itself is being driven by a steady field. Therefore there are no problems of signal interference from electrical noise pickup or amplifier recovery time after large overload. The use of a pair of TDW assemblies in a push-pull arrangement permits the TDW film of the first assembly to be restored to its initial state while the second is being read or written into, so that the first of the pair is ready for reuse immediately after the operation of the second is complete. Conversely, the second assembly is restored while the first is used, and is ready for use immediately after the first, as shown. This organization permits the free operation of the system without any restriction on the addressing sequence, that is, addresses in the same plane, or even the same block can be read or written into any sequence, without waiting time.

The enclosure for the memory stack contains outside removable side panels and hinged doors front and rear. A blower is mounted in the rear door near the bottom and exhausts through an opening at the top near the front. A filter is provided at the blower intake. The entire enclosure is mounted on a castered dolly with a floor lock.

The blower for the suction system is mounted in the bottom of this enclosure.

One enclosure for logic and two for power supplies are provided. These enclosures have removable sides and doors front and rear, and are also caster-dolly mounted with floor locks. The logic enclosure has filter-fitted air inlets at the bottom of the front doors only. Blowers are mounted in the top panel on the logic enclosure and power supply enclosures.

Card racks in the logic enclosure are mounted so that the pins are toward the front.

What has been described and illustrated is a particular embodiment of a memory system apparatus using the principle of traveling domain walls. It will, of course, be appreciated that various modifications and substitutions may be made without departing from the scope and spirit of the invention.

What is claimed is:

1. A memory system apparatus utilizing the concept of traveling domain walls comprising a memory stack frame including a plurality of traveling wall domain assemblies and a plurality of removable memory plates, a purality of stack activating matrices with their respective drivers and timing control means, said matrices connected to said wall domain assemblies to provide bias current, drive current, nucleation current and information current to a selected one of said wall domain assemblies, and a sensing system including information/sense lines, a velocity detection and correction means connected to said wall domain assemblies to detect timing errors and to correct said errors through a variation in the amplitude of said drive current applied to the selected one of said wall domain assemblies.

2. The memory system apparatus as set forth in claim 1 wherein said sensing means includes as a timing sensing means a plurality of windings located within said traveling domain assemblies and positioned in a zigzag manner along a traveling domain wall element.

3. The memory system apparatus as set forth in claim 2 wherein each of said zigzag windings is a film deposited upon a thin printed circuit board and each winding is connected to an amplifier for amplifying said sensed signal on a zigzag winding.

4. The memory system apparatus as set forth in claim 2 wherein said sensing means also includes a phase compensating means connected between the zigzag windings and the selective driving current means of said domain wall assemblies.

5. A memory system apparatus utilizing a traveling domain wall element as a magnetic medium scanning means comprising a memory stack frame, a bias matrix, a drive matrix, a nucleation matrix and an information matrix connected to activate said memory stack frame, a plurality of corresponding drive generating means respectively connected to each of said matrices, an address register also connected to said matrices to indicate a selected memory location, a timing and control means connected to the bias, drive and nucleating drive generating means, a phase compensating means connected between said timing and control means and said drive generating means, a plurality of information/sense means, a plurality of zigzag wound sensing means included within said memory stack frame, and a plurality of amplifiers respectively connected to the information/sense means and zigzag sensing means and to said phase compensating means to provide a velocity indicating signal to said compensating means to thereby cause said drive generating means to vary the drive current to said memory stack frame whereby the scanning velocity of the traveling domain wall along its element is varied.

6. A memory apparatus using a magnetic traveling domain wall as a reading and writing means comprising a memory plane including a plurality of traveling domain wall assemblies, a plurality of information/sense lines, a plurality of zigzag velocity sense lines and a bias coil means, a first plane selection means activated by a two level bias driver a nucleation pulse generator and a bipolar solenoid driver, a traveling domain wall selection means connected between said first plane selection means and said memory plane to selectively determine the particular traveling domain wall assembly within said memory plane to be activated, and a second plane selection means activated by an information driver, and including means connected to said second plane selection means for reading out and amplifying the signals in and for supplying information current to, said information/sense lines and for receiving, reading out and amplifying the zigzag control signals from said memory plane.

7. A memory apparatus without mechanical motion using a magnetic traveling domain wall as a reading and writing means comprising a memory stack means with an information matrix, a bias matrix, a drive matrix, and a nucleation matrix connected to said stack means for selectively activating portions thereof, each of said matrices having a separate generating driving means respectively connected thereto, an input/output interface means to receive information into and provide information out of said memory apparatus, a timing and control means connected between said input/output interface and the bias, drive and nucleation generating driving means, an address register and an information register both connected to said input/output interface means, to temporarily store the address and data information during read and write operations, a write strobe gating means connected between said information register and said information driving means to synchronize the entry of information into said memory stack, and a readout sensing means including delay and read strobe gating means connected between said memory stack and said information register to said interface means to synchronize the exit of information from said memory stack.

8. The memory apparatus as set forth in claim 7 wherein said apparatus further includes a phase compensating means connected between said timing and control means and the drive generating means, means for sensing the velocity of the traveling domain wall along said traveling domain wall assembly and a strobe generator delay means, said velocity sensing means connected to said phase compensating means to provide thereto a velocity indicating signal, whereby said drive generating means is compensated to correctively vary the velocity of the drive signal to said stack and said strobe generator delay means to vary data strobe delay to correspond with data synchronizing information recorded with the data.

9. The memory apparatus as set forth in claim 8 wherein said apparatus further includes a lead-in timing and control means with a lead-in recognition and register means being connected to said write strobe gate to initially provide to said information driver a fixed lead-in signal pattern for reference purposes.

References Cited

UNITED STATES PATENTS

| | | | |
|---|---|---|---|
| 3,140,471 | 8/1964 | Fuller | 340—174 |
| 3,408,637 | 10/1968 | Gibson | 340—174 |

BERNARD KONICK, Primary Examiner

KENNETH E. KROSIN, Assistant Examiner